UNITED STATES PATENT OFFICE.

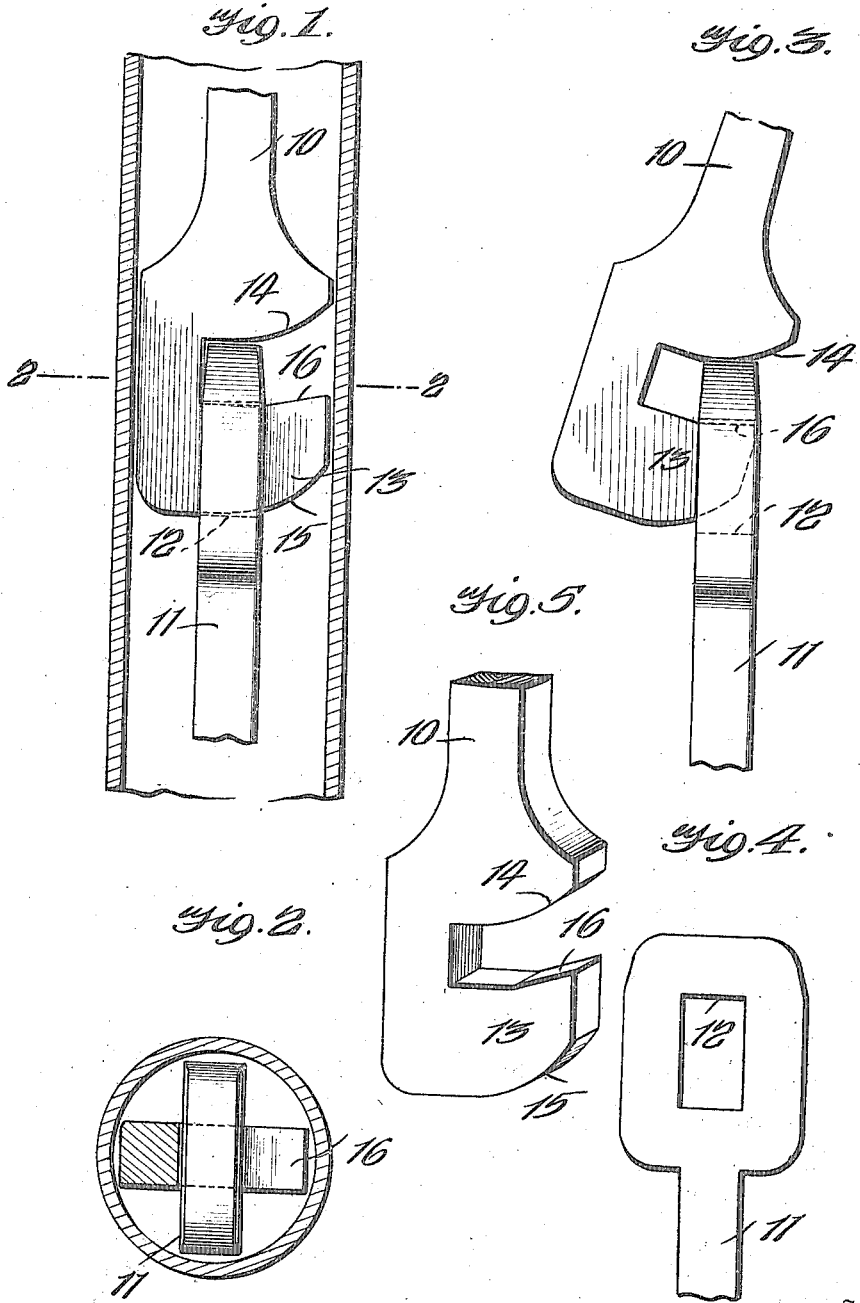

ALTON E. GILBERT, OF TULSA, OKLAHOMA.

WELL-ROD COUPLING.

1,255,406.  Specification of Letters Patent.  Patented Feb. 5, 1918.

Application filed January 10, 1917. Serial No. 141,639.

*To all whom it may concern:*

Be it known that I, ALTON E. GILBERT, a citizen of the United States, and a resident of Tulsa, in the county of Tulsa and State of Oklahoma, have invented a certain new and useful Improvement in Well-Rod Couplings, of which the following is a specification.

My present invention relates particularly to well rod couplings, my object being to provide a simple, strong, and durable construction wherein the coupled members are integral with the rod ends to be joined, and, while effectively and efficiently engaging one another laterally, are prevented from uncoupling except when in inclined relation to one another, by means forming an integral part thereof, and of such nature as to require but minimum inclination in order that uncoupling may be effected while the elevators are fast to the rod.

These objects as well as the structural advantages of my improvement, will be apparent from the following description, reference being made to the accompanying drawing, forming a part of this specification, and wherein—

Figure 1 is a sectional view through a well tube, illustrating my coupling members in operative relation therein;

Fig. 2 is a horizontal section, taken substantially on line 2—2 of Fig. 1;

Fig. 3 is a side view of my improved coupling members partly disengaged;

Fig. 4 is a face view of the female member;

Fig. 5 is a perspective view of the male member.

Referring now to these figures, my improved coupling consists of male and female members 10 and 11 respectively, the shanks of which are integral continuations of the rod sections intended to be joined thereby, the bodies of the male and female members being similarly flattened, though disposed at right angles with respect to one another when joined as seen in Fig. 1, the female member having a squared opening 12, as best seen in Fig. 4, into which the hook 13 of the male member fits and through which it extends, the hook 13 being in length considerably greater than the width of the female member.

The hook 13 opposes a portion of the end of the body of the male member 10, to form a space receiving the extreme end of the female member 11, said end of the male member being curved away from the hook as seen at 14, at one side thereof near the extremity of the hook, in a degree similar to that of the curvature of the outer surface of the hook at 15, adjacent its extremity, the inner engaging surface of the hook having, at a point beyond the female member and adjacent its extremity, an inclined face 16 which prevents disengagement of the hook in a truly horizontal plane and at the same time renders their disengagement possible at a minimum inclination relative to one another, so that the uncoupling may be effected while the elevators are fast to the rod.

It is due to these several features of construction that I am thus enabled to provide a simple, strong, highly effective coupling, which will be practical in use, economical, and effect a considerable saving of labor in the handling, connection, and disconnection of the rod sections.

I claim:—

1. A well rod coupling comprising male and female members, the latter of which consists of a flat body having a transverse squared opening, and the male member having a flat body provided with a laterally opening hook to interfit and extend through and beyond the said opening of the female member, said hook opposing a portion of the adjacent end of the body of the male member and having its inner engaging face provided with a portion extending beyond the female member and inclined toward the extreme end of the latter, the outer face of the hook and the end surface of the body of the male member being curved to permit of withdrawal of the hook in slightly inclined relation to the female member.

2. A well rod coupling comprising male and female members, the latter of which consists of a flat body having a transverse squared opening, and the male member having a flat body provided with a laterally opening hook to interfit and extend through and beyond the said opening of the female member, said hook opposing a portion of the adjacent end of the body of the male member and having its inner engaging face provided with a portion extending beyond the female member and inclined toward the extreme end of the latter, the said end surface of the body opposite the hook being spaced from the latter and extending closely adjacent to the extreme end of the female member when the hook is in engaged position, and the outer face of the hook and the end surface of the body of the male member being curved to permit of withdrawal of the hook in slightly inclined relation to the female member.

ALTON E. GILBERT.

Copies of this patent may be obtained for five cents each, by addressing the "Commissioner of Patents, Washington, D. C."